(12) United States Patent
Hirayama et al.

(10) Patent No.: US 12,261,482 B2
(45) Date of Patent: Mar. 25, 2025

(54) LAMINATED CORE AND ELECTRIC MOTOR

(71) Applicant: NIPPON STEEL CORPORATION, Tokyo (JP)

(72) Inventors: Ryu Hirayama, Tokyo (JP); Kazutoshi Takeda, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 378 days.

(21) Appl. No.: 17/294,202

(22) PCT Filed: Dec. 17, 2019

(86) PCT No.: PCT/JP2019/049294
§ 371 (c)(1),
(2) Date: May 14, 2021

(87) PCT Pub. No.: WO2020/129942
PCT Pub. Date: Jun. 25, 2020

(65) Prior Publication Data
US 2022/0014051 A1    Jan. 13, 2022

(30) Foreign Application Priority Data

Dec. 17, 2018 (JP) ................................ 2018-235857

(51) Int. Cl.
*H02K 1/16* (2006.01)
*H01F 27/245* (2006.01)
(Continued)

(52) U.S. Cl.
CPC ........... *H02K 1/165* (2013.01); *H01F 27/245* (2013.01); *H02K 1/146* (2013.01); *H02K 15/024* (2013.01)

(58) Field of Classification Search
CPC .......... C09D 5/23; C09D 5/18; C09D 163/00; H01F 3/02; H01F 1/18; H01F 41/00;
(Continued)

(56) References Cited

U.S. PATENT DOCUMENTS 3,386,058 A   5/1968  Michel
4,025,379 A   5/1977  Whetstone
(Continued)

FOREIGN PATENT DOCUMENTS

CN        102792556 A        11/2012
DE     102005038778 A1  *    3/2007
(Continued)

OTHER PUBLICATIONS

Japanese Industrial Standard (JIS) C 2552: 2014, relevance discussed in specification.
(Continued)

*Primary Examiner* — Tran N Nguyen
(74) *Attorney, Agent, or Firm* — Renner, Otto, Boisselle & Sklar, LLP

(57) ABSTRACT

A laminated core including a plurality of electrical steel sheets stacked on each other, and adhesion parts which are provided between the electrical steel sheets adjacent to each other in an axial direction thereof and adhering the electrical steel sheets to each other, in which each of the electrical steel sheets includes an annular core back part, and a plurality of tooth parts which extend from the core back part in a radial direction of the core back part and are disposed at intervals in a circumferential direction of the core back part, and each of the tooth parts of the electrical steel sheets has an adhesion region provided with the adhesion part having a belt shape extending in the circumferential direction.

22 Claims, 10 Drawing Sheets

(51) Int. Cl.
*H02K 1/14* (2006.01)
*H02K 15/02* (2006.01)

(58) Field of Classification Search
CPC . H01F 41/02; H02K 1/04; H02K 1/18; H02K 15/00; H02K 15/02; C08L 75/04; C08L 67/00; C08L 23/00
See application file for complete search history.

(56) References Cited

U.S. PATENT DOCUMENTS

| | | | |
|---|---|---|---|
| 4,103,195 | A | 7/1978 | Torossian |
| 4,413,406 | A | 11/1983 | Bennett |
| 5,142,178 | A | 8/1992 | Kloster et al. |
| 5,248,405 | A | 9/1993 | Kaneda et al. |
| 5,338,996 | A | 8/1994 | Yamamoto |
| 5,448,119 | A | 9/1995 | Kono et al. |
| 5,994,464 | A | 11/1999 | Ohsawa et al. |
| 6,495,936 | B2 | 12/2002 | Kikuchi et al. |
| 6,653,758 | B2 | 11/2003 | Tsuneyoshi et al. |
| 7,298,064 | B2 | 11/2007 | Yamamoto |
| 7,562,439 | B2 | 7/2009 | Yamamoto |
| 7,859,163 | B2 | 12/2010 | Bertocchi et al. |
| 7,952,254 | B2 | 5/2011 | Cho et al. |
| 7,960,890 | B2 * | 6/2011 | Miyake ............... H02K 15/022 310/43 |
| 8,015,691 | B2 | 9/2011 | Miyake |
| 8,580,217 | B2 | 11/2013 | Hipszki et al. |
| 8,581,468 | B2 | 11/2013 | Kudose et al. |
| 8,697,811 | B2 | 4/2014 | Kishi et al. |
| 8,943,677 | B2 | 2/2015 | Gerster et al. |
| 9,331,530 | B2 | 5/2016 | Jang et al. |
| 9,512,335 | B2 | 12/2016 | Hoshi et al. |
| 9,770,949 | B2 | 9/2017 | Fudemoto et al. |
| 9,833,972 | B2 | 12/2017 | Ohishi et al. |
| 10,340,754 | B2 | 7/2019 | Ogino et al. |
| 10,348,170 | B2 | 7/2019 | Izumi et al. |
| 10,476,321 | B2 | 11/2019 | Li et al. |
| 10,491,059 | B2 | 11/2019 | Murakami et al. |
| 10,547,225 | B2 | 1/2020 | Hattori et al. |
| 10,574,112 | B2 | 2/2020 | Tomonaga |
| 10,819,201 | B2 | 10/2020 | Thumm et al. |
| 10,840,749 | B2 | 11/2020 | Chaillou et al. |
| 11,056,934 | B2 | 7/2021 | Kubota et al. |
| 11,616,407 | B2 | 3/2023 | Hino et al. |
| 2002/0047459 | A1 | 4/2002 | Adaeda et al. |
| 2002/0163277 | A1 | 11/2002 | Miyake et al. |
| 2004/0056556 | A1 | 3/2004 | Fujita |
| 2004/0124733 | A1 | 7/2004 | Yamamoto et al. |
| 2006/0043820 | A1 | 3/2006 | Nakahara |
| 2007/0024148 | A1 | 2/2007 | Maita et al. |
| 2007/0040467 | A1 | 2/2007 | Gu |
| 2007/0182268 | A1 | 8/2007 | Hashiba et al. |
| 2009/0026873 | A1 | 1/2009 | Matsuo et al. |
| 2009/0195110 | A1 | 8/2009 | Miyaki |
| 2009/0230812 | A1 | 9/2009 | Cho et al. |
| 2010/0090560 | A1 | 4/2010 | Myojin |
| 2010/0197830 | A1 | 8/2010 | Hayakawa et al. |
| 2010/0219714 | A1 | 9/2010 | Abe et al. |
| 2010/0244617 | A1 | 9/2010 | Nobata et al. |
| 2011/0180216 | A1 | 7/2011 | Miyake |
| 2011/0269894 | A1 | 11/2011 | Miyamoto |
| 2012/0088096 | A1 | 4/2012 | Takeda et al. |
| 2012/0128926 | A1 | 5/2012 | Ohishi et al. |
| 2012/0156441 | A1 | 6/2012 | Gerster |
| 2012/0235535 | A1 | 9/2012 | Watanabe |
| 2012/0288659 | A1 | 11/2012 | Hoshi et al. |
| 2013/0244029 | A1 | 9/2013 | Igarashi et al. |
| 2014/0023825 | A1 | 1/2014 | Igarashi et al. |
| 2015/0028717 | A1 | 1/2015 | Luo et al. |
| 2015/0097463 | A1 | 4/2015 | Blocher et al. |
| 2015/0130318 | A1 | 5/2015 | Kitada et al. |
| 2015/0256037 | A1 | 9/2015 | Kudose |
| 2015/0337106 | A1 | 11/2015 | Kajihara |
| 2016/0023447 | A1 | 1/2016 | Shimizu |
| 2016/0352159 | A1 | 12/2016 | Li et al. |
| 2016/0352165 | A1 | 12/2016 | Fubuki |
| 2017/0117758 | A1 | 4/2017 | Nakagawa |
| 2017/0287625 | A1 | 10/2017 | Ito |
| 2017/0342519 | A1 | 11/2017 | Uesaka et al. |
| 2017/0368590 | A1 | 12/2017 | Senda et al. |
| 2018/0030292 | A1 | 2/2018 | Gotou |
| 2018/0056629 | A1 | 3/2018 | Hamamura |
| 2018/0134926 | A1 | 5/2018 | Lei et al. |
| 2018/0159389 | A1 | 6/2018 | Nishikawa |
| 2018/0212482 | A1 | 7/2018 | Nigo |
| 2018/0248420 | A1 | 8/2018 | Enokizono et al. |
| 2018/0295678 | A1 | 10/2018 | Okazaki et al. |
| 2018/0309330 | A1 | 10/2018 | Ueda |
| 2018/0342925 | A1 | 11/2018 | Horii et al. |
| 2019/0010361 | A1 | 1/2019 | Hoshi |
| 2019/0040183 | A1 | 2/2019 | Yoshida et al. |
| 2020/0048499 | A1 | 2/2020 | Andou et al. |
| 2020/0099263 | A1 | 3/2020 | Hirosawa et al. |
| 2020/0186014 | A1 | 6/2020 | Kusuyama |
| 2021/0296975 | A1 | 9/2021 | Hino et al. |

FOREIGN PATENT DOCUMENTS

| | | | |
|---|---|---|---|
| EP | 3553799 A1 | 10/2019 | |
| EP | 3562006 A1 | 10/2019 | |
| FR | 2803126 A1 | 6/2001 | |
| JP | 56-065326 A | 6/1981 | |
| JP | 57-006427 A | 1/1982 | |
| JP | 60-170681 A | 9/1985 | |
| JP | 60-186834 A | 12/1985 | |
| JP | 60-186834 U | 12/1985 | |
| JP | 62-009951 A | 1/1987 | |
| JP | 63-207639 A | 8/1988 | |
| JP | 01-168777 A | 7/1989 | |
| JP | 03-124247 A | 5/1991 | |
| JP | 03-247683 A | 11/1991 | |
| JP | 04-028743 A | 3/1992 | |
| JP | 04-028743 U | 3/1992 | |
| JP | 07-118620 A | 5/1995 | |
| JP | 07-298567 A | 11/1995 | |
| JP | 08-259899 A | 10/1996 | |
| JP | 10-304610 A | 11/1998 | |
| JP | 11-162724 A | 6/1999 | |
| JP | 2000-050539 A | 2/2000 | |
| JP | 2000-152570 A | 5/2000 | |
| JP | 2001-115125 A | 4/2001 | |
| JP | 2002-078257 A | 3/2002 | |
| JP | 2002-088107 A | 3/2002 | |
| JP | 2002-105283 A | 4/2002 | |
| JP | 2002-125341 A | 4/2002 | |
| JP | 2002-151335 A | 5/2002 | |
| JP | 2002-151339 A | 5/2002 | |
| JP | 2002-164224 A | 6/2002 | |
| JP | 2002-332320 A | 11/2002 | |
| JP | 2003-199303 A | 7/2003 | |
| JP | 2003-206464 A | 7/2003 | |
| JP | 2003-219585 A | 7/2003 | |
| JP | 2003-264962 A | 9/2003 | |
| JP | 2003284274 A | 10/2003 | |
| JP | 2004-088970 A | 3/2004 | |
| JP | 2004-111509 A | 4/2004 | |
| JP | 2004-150859 A | 5/2004 | |
| JP | 2005-019642 A | 1/2005 | |
| JP | 2005-268589 A | 9/2005 | |
| JP | 2005-269732 A | 9/2005 | |
| JP | 2006-254530 A | 9/2006 | |
| JP | 2006-288114 A | 10/2006 | |
| JP | 2006-353001 A | 12/2006 | |
| JP | 2006334648 A * | 12/2006 | |
| JP | 2007015302 A | 1/2007 | |
| JP | 2007-039721 A | 2/2007 | |
| JP | 2008067459 A * | 3/2008 | ............... H02K 1/18 |
| JP | 4143090 B | 9/2008 | |
| JP | 2009072035 A | 4/2009 | |
| JP | 2009-177895 A | 8/2009 | |
| JP | 2010-004716 A | 1/2010 | |
| JP | 2010081659 A | 4/2010 | |
| JP | 2010-220324 A | 9/2010 | |

(56) References Cited

FOREIGN PATENT DOCUMENTS

| | | |
|---|---|---|
| JP | 2010-259158 A | 11/2010 |
| JP | 2011-023523 A | 2/2011 |
| JP | 2011-195735 A | 10/2011 |
| JP | 2012029494 A | 2/2012 |
| JP | 2012-061820 A | 3/2012 |
| JP | 2012060773 A | 3/2012 |
| JP | 2012-120299 A | 6/2012 |
| JP | 2012196100 A | 10/2012 |
| JP | 2013-089883 A | 5/2013 |
| JP | 2013-181101 A | 9/2013 |
| JP | 2013-253153 A | 12/2013 |
| JP | 5423465 B2 | 2/2014 |
| JP | 2014-096429 A | 5/2014 |
| JP | 2014-155347 A | 8/2014 |
| JP | 2015-012756 A | 1/2015 |
| JP | 2015-082848 A | 4/2015 |
| JP | 2015-136228 A | 7/2015 |
| JP | 2015-142453 A | 8/2015 |
| JP | 2015-164389 A | 9/2015 |
| JP | 2015-171202 A | 9/2015 |
| JP | 2016-025317 A | 2/2016 |
| JP | 2016-046969 A | 4/2016 |
| JP | 2016-073109 A | 5/2016 |
| JP | 2016-140134 A | 8/2016 |
| JP | 2016-171652 A | 9/2016 |
| JP | 2016167907 A | 9/2016 |
| JP | 2017-005906 A | 1/2017 |
| JP | 2017-011863 A | 1/2017 |
| JP | 2017-028911 A | 2/2017 |
| JP | 2017-046442 A | 3/2017 |
| JP | 2017-075279 A | 4/2017 |
| JP | 2017-218596 A | 12/2017 |
| JP | 2018-038119 A | 3/2018 |
| JP | 2018-061319 A | 4/2018 |
| JP | 2018-078691 A | 5/2018 |
| JP | 2018-083930 A | 5/2018 |
| JP | 2018-093704 A | 6/2018 |
| JP | 2018-107852 A | 7/2018 |
| JP | 2018/138634 A | 9/2018 |
| JP | 2018-145492 A | 9/2018 |
| KR | 10-2017-0087915 A | 7/2017 |
| KR | 10-2018-0110157 A | 10/2018 |
| TW | 201809023 A | 3/2018 |
| WO | 2010/082482 A1 | 7/2010 |
| WO | 2011/013691 A1 | 2/2011 |
| WO | 2011/054065 A2 | 5/2011 |
| WO | 2014/102915 A1 | 7/2014 |
| WO | 2016017132 A1 | 2/2016 |
| WO | 2017/033229 A1 | 3/2017 |
| WO | 2017104479 A1 | 6/2017 |
| WO | 2017/170957 A | 10/2017 |
| WO | 2017/199527 A1 | 11/2017 |
| WO | 2018/043429 A1 | 3/2018 |
| WO | 2018/093130 A1 | 5/2018 |
| WO | 2018/105473 A1 | 6/2018 |
| WO | 2018/138864 A1 | 8/2018 |
| WO | 2018/207277 A1 | 11/2018 |
| WO | 2018/216565 A1 | 11/2018 |
| WO | 2020/129921 A1 | 6/2020 |
| WO | 2020/129923 A1 | 6/2020 |
| WO | 2020/129924 A1 | 6/2020 |
| WO | 2020/129925 A1 | 6/2020 |
| WO | 2020/129926 A1 | 6/2020 |
| WO | 2020/129927 A1 | 6/2020 |
| WO | 2020/129928 A1 | 6/2020 |
| WO | 2020/129929 A1 | 6/2020 |
| WO | 2020/129935 A1 | 6/2020 |
| WO | 2020/129936 A1 | 6/2020 |
| WO | 2020/129937 A1 | 6/2020 |
| WO | 2020/129938 A1 | 6/2020 |
| WO | 2020/129940 A1 | 6/2020 |
| WO | 2020/129941 A1 | 6/2020 |
| WO | 2020/129946 A1 | 6/2020 |
| WO | 2020/129948 A1 | 6/2020 |
| WO | 2020/129951 A1 | 6/2020 |

OTHER PUBLICATIONS

Japanese Industrial Standard (JIS) C 2553: 2012, relevance discussed in specification.
Japanese Industrial Standard (JIS) R 1602: 1995, relevance discussed in specification.
Japanese Industrial Standard (JIS) Z 2241: 2011.
Japanese Industrial Standard (JIS) K 7252-1:2016.
Japanese Industrial Standard (JIS) K 7121-1987.
Japanese Industrial Standard (JIS) K 6850: 1999.
The papers of technical meetings in the Institute of Electrical Engineers of Japan,RM-92-79, 1992.
Datasheet of Nylon 6, Cast (Year: N/A, Printed Jun. 28, 2023).
Matweb, "Plaskolite West Optix@ CA—41 FDA General Purpose Acrylic Resin", 2 pages, retrieved online Dec. 19, 2022, www.matweb.com/search/DataSheet.aspx?MatGUID=ceec51c04f714fb383d01496424432d9. (Year: 2022).

\* cited by examiner

D1 = 2D2

D1 = D2

LAMINATED CORE AND ELECTRIC MOTOR

TECHNICAL FIELD

The present invention relates to a laminated core and an electric motor.

Priority is claimed on Japanese Patent Application No. 2018-235857, filed Dec. 17, 2018, the content of which is incorporated herein by reference.

BACKGROUND ART

Conventionally, a laminated core as described in Patent Document 1 below is known. In this laminated core, electrical steel sheets adjacent to each other in an axial direction thereof adhere to each other.

CITATION LIST

Patent Document

[Patent Document 1]
  Japanese Unexamined Patent Application, First Publication No. 2011-023523

SUMMARY OF THE INVENTION

Problems to be Solved by the Invention

There is room for improvement in improving magnetic properties of the conventional laminated core.

The present invention has been made in view of the above circumstances, and an object of the present invention is to improve magnetic properties of a laminated core.

Means for Solving the Problem (1) One aspect of the present invention is a laminated core including a plurality of electrical steel sheets stacked on each other, and adhesion parts which are provided between the electrical steel sheets adjacent to each other in an axial direction thereof and adhering the electrical steel sheets to each other, in which each of the electrical steel sheets includes an annular core back part, and a plurality of tooth parts which extend from the core back part in a radial direction of the core back part and are disposed at intervals in a circumferential direction of the core back part, and each of the tooth parts of the electrical steel sheets includes an adhesion region provided with the adhesion part having a belt shape or a band extending in the circumferential direction.

According to the above configuration, each of the tooth parts of the electrical steel sheets has the adhesion region provided with the adhesion part having a belt shape or band. Since the adhesion part having a belt shape or band extends in one direction, an adhesive area of the adhesion part can be increased and enhance adhesion strength thereof as compared to a case in which point-shaped adhesion parts are provided intermittently in the same range.

A strain due to cure shrinkage of an adhesive occurs in a region of each of the electrical steel sheets in contact with the adhesion part, and an iron loss of each of the electrical steel sheets increases in the region. Here, the region of each of the electrical steel sheets in which the iron loss increases due to the strain caused by the contact with the adhesion region is called a "deterioration region". According to the above configuration, since the adhesion parts have belt shapes or a band extending in the circumferential direction and are provided on the tooth parts, the deterioration region extends in the circumferential direction of the tooth parts. Since magnetic flux flowing through the tooth parts is in the radial direction, a length of a path of the magnetic flux passing through the deterioration region decreases due to the deterioration region extending in the circumferential direction. Therefore, magnetic resistance to each magnetic flux in a magnetic circuit is reduced, and deterioration of magnetic properties of the laminated core can be inhibited.

(2) The laminated core according to the above (1) may have a configuration in which the adhesion regions are formed on a side closer to the core back part than the vicinity of tips of the tooth parts.

The magnetic flux diffuses and extends from the tips of the tooth parts to both circumferential sides. For this reason, the magnetic flux tends to concentrate at both circumferential end parts in the vicinities of the tips of the tooth parts. If the deterioration region is provided in a region in which the magnetic flux is concentrated, the iron loss tends to remarkably increase. For this reason, if the deterioration region is provided in the vicinities of the tips of the tooth parts, the iron loss tends to increase. According to the above configuration, since the adhesion regions are located on the side closer to the core back part than in the vicinity of the tips of the tooth parts, the deterioration region can be disposed away from a region having a high magnetic flux density, thereby inhibiting an increase in iron loss.

(3) The laminated core according to the above (1) or the above (2) may have a configuration in which width dimensions of the adhesion regions in the radial direction increase from circumferential central parts of the tooth parts toward circumferential end part sides of the tooth parts.

The magnetic flux diffuses and extends from the tips of the tooth parts to both circumferential sides. Also, the magnetic flux tends to flow through the shortest distance. For this reason, the magnetic flux density of the tooth parts increases toward the circumferential end part sides. If a variation in the magnetic flux density of the tooth parts increases in the circumferential direction, the magnetic properties of the laminated core may deteriorate. According to the above configuration, the width dimensions of the adhesion regions in the radial direction increase from the central parts of the tooth parts toward the circumferential end part sides. That is, a length of the deterioration region in the radial direction becomes longer from the central parts of the tooth parts toward the circumferential end part sides. For this reason, the magnetic resistance of the tooth parts increases toward an outer side thereof in the circumferential direction, and the magnetic flux does not easily flow on the circumferential end part sides. As a result, the variation in the magnetic flux density of the tooth parts can be inhibited, and the magnetic flux density in the tooth parts can be made uniform, thereby improving the magnetic properties of the laminated core.

(4) The laminated core according to the above (1) or the above (2) may have a configuration in which the adhesion regions extend in arc shapes in the circumferential direction.

According to the above configuration, since the adhesion parts can be uniformly applied in the circumferential direction, the manufacturing process can be simplified.

(5) The laminated core according to the above (1) to the above (4) may have a configuration in which the adhesion parts extend over the entire widths of the tooth parts.

According to the above configuration, since the adhesion parts extend over the entire widths of the tooth parts, the adhesion strength between the tooth parts can be easily secured.

(6) In the laminated core according to any one of the above (1) to the above (5), an average thickness of the adhesion parts may be 1.0 µm to 3.0 µm.

(7) In the laminated core according to any one of the above (1) to the above (6), an average tensile modulus of elasticity E of the adhesion parts may be 1500 MPa to 4500 MPa.

(8) In the laminated core according to any one of the above (1) to the above (7), the adhesion parts may be room temperature adhesion type acrylic-based adhesives each containing SGA made of an elastomer-containing acrylic-based adhesive.

(9) In the laminated core according to any one of the above (1) to the above (8), a melting point of each of the adhesion parts may be 180° C. or higher.

(10) An electric motor according to one aspect of the present invention is an electric motor including the laminated core according to any one of the above (1) to the above (9).

Since the electric motor having the above configuration has the laminated core having excellent magnetic properties, energy efficiency of the electric motor can be increased.

Effects of the Invention

According to the present invention, magnetic properties of a laminated core can be improved.

EMBODIMENTS FOR IMPLEMENTING THE INVENTION

Hereinafter, an electric motor according to one embodiment of the present invention will be described with reference to the drawings. Also, in the present embodiment, as the electric motor, a motor, specifically, an AC motor, more specifically, a synchronous motor, and more specifically, a permanent magnetic electric motor will be described as an example. This type of motor is suitably adopted for, for example, an electric vehicle.

Figure 1:
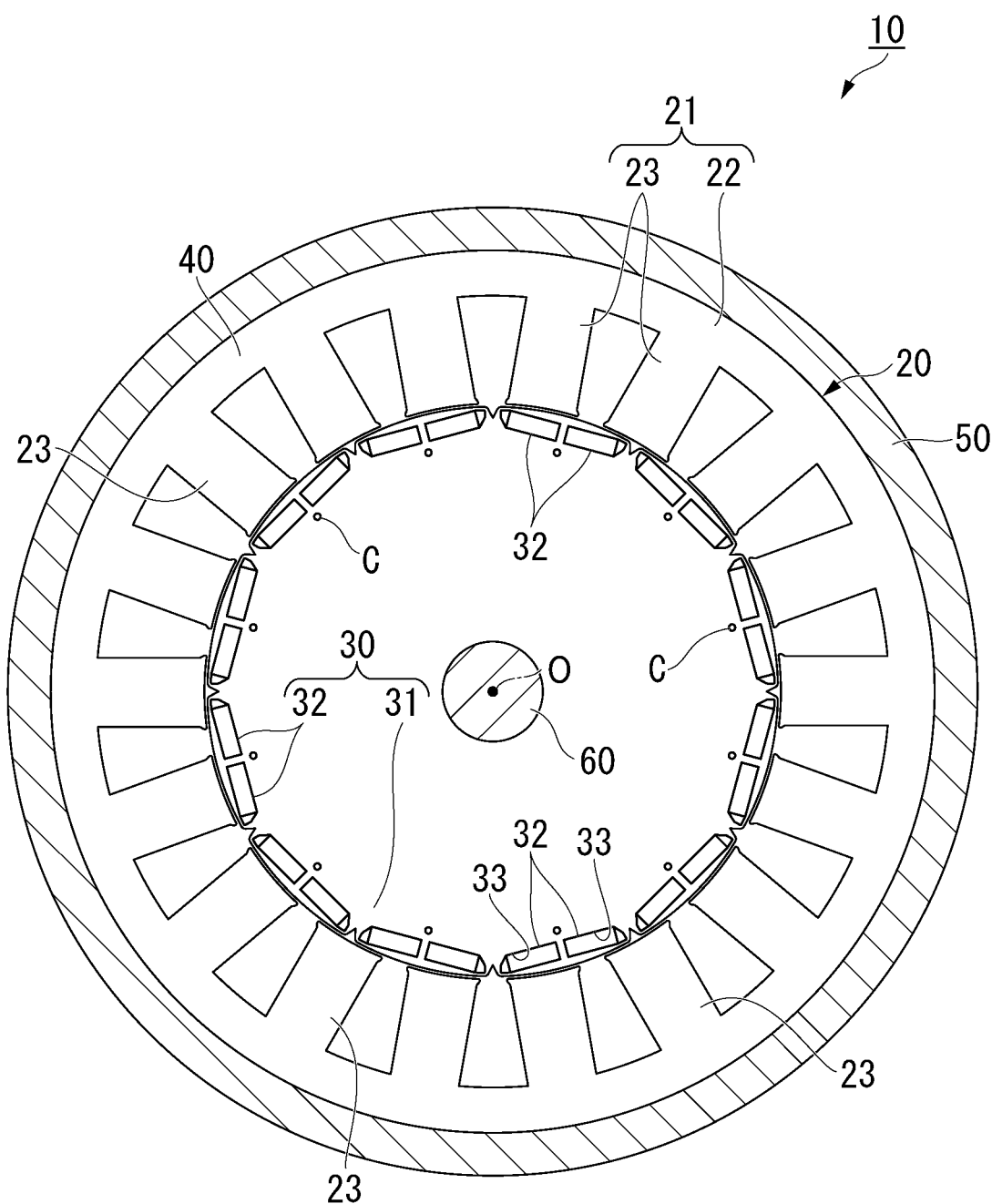
FIG. 1 is a cross-sectional view of an electric motor according to one embodiment of the present invention.
Figure 2:
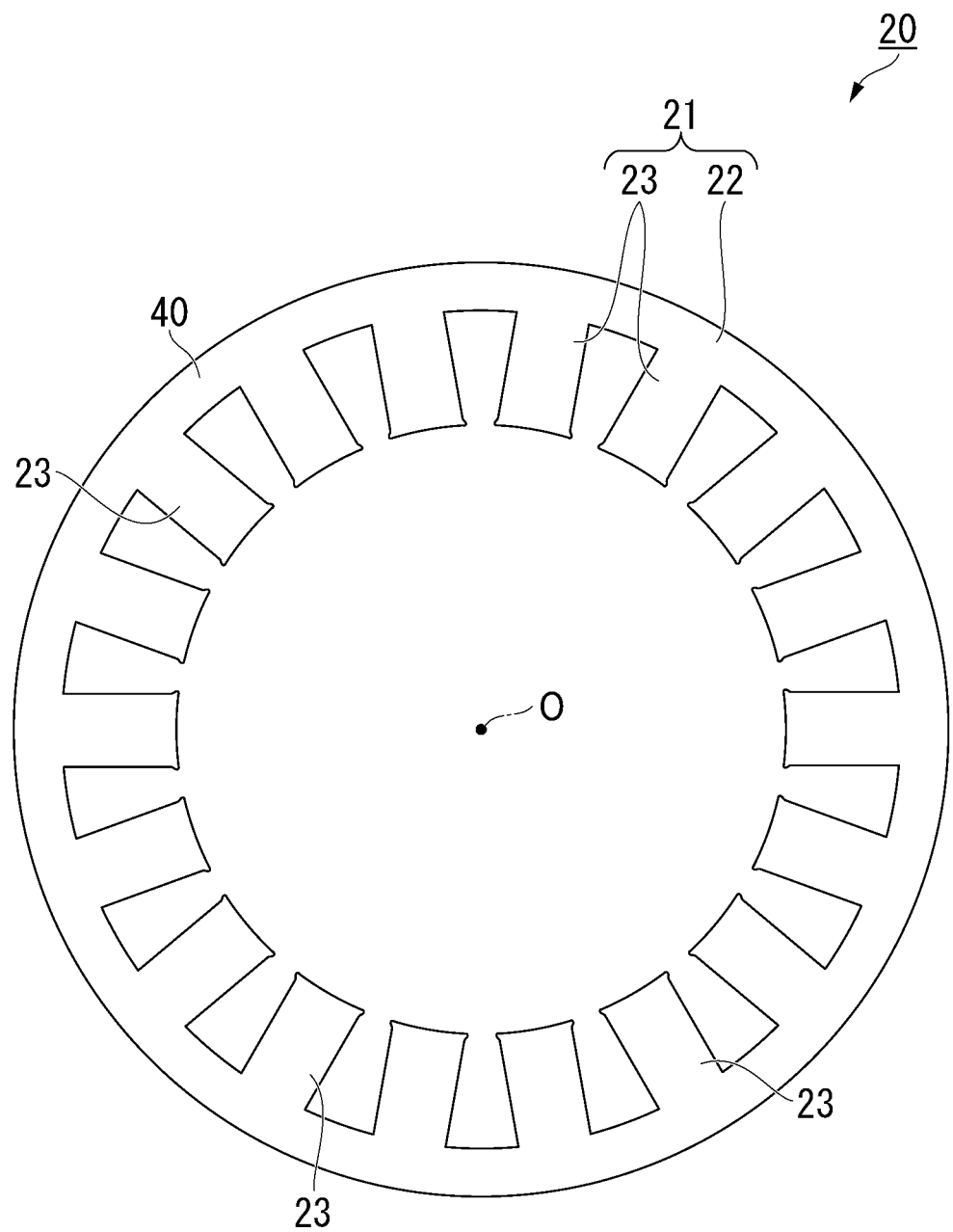
FIG. 2 is a plan view of a stator included in the electric motor shown in FIG. 1.

As shown in FIGS. 1 and 2, an electric motor 10 includes a stator 20, a rotor 30, a case 50, and a rotation shaft 60. The stator 20 and the rotor 30 are accommodated in the case 50. The stator 20 is fixed to the case 50.

In the electric motor 10 of the present embodiment, for example, an excitation current having an effective value of 10 A and a frequency of 100 Hz is applied to each phase of the stator 20, and along with this, the rotor 30 and the rotation shaft 60 rotate at a rotation speed of 1000 rpm.

In the present embodiment, as the electric motor 10, an inner rotor type electric motor in which the rotor 30 is located inside the stator 20 is adopted. However, as the electric motor 10, an outer rotor type electric motor in which the rotor 30 is located outside the stator 20 may be adopted. Further, in the present embodiment, the electric motor 10 is a three-phase AC motor having 12 poles and 18 slots. However, for example, the number of poles, the number of slots, the number of phases, and the like can be changed as appropriate.

The stator 20 includes a stator core (a laminated core) 21 and windings (not shown).

The stator core 21 includes an annular core back part 22 and a plurality of tooth parts 23. An axial direction (a direction of a central axis O of the stator core 21) of the stator core 21 (core back part 22) is referred to as the axial direction, a radial direction (a direction orthogonal to the central axis O of the stator core 21) of the stator core 21 (core back part 22) is referred to as the radial direction, and a circumferential direction (a direction revolving around the central axis O of the stator core 21) of the stator core 21 (core back part 22) is referred to as the circumferential direction below.

The core back part 22 is formed in an annular shape in a plan view of the stator 20 seen from the axial direction.

The plurality of tooth parts 23 extend inward in the radial direction from the core back part 22 (toward the central axis O of the core back part 22 in the radial direction). The plurality of tooth parts 23 are disposed at equal intervals in the circumferential direction. In the present embodiment, 18 tooth parts 23 are provided at every 20 degrees of a central angle centered on the central axis O. The plurality of tooth parts 23 are formed to have the same shape and the same size as each other.

The windings are wound around the tooth parts 23. The windings may be concentrated windings or distributed windings.

The rotor 30 is disposed inside the stator 20 (stator core 21) in the radial direction. The rotor 30 includes a rotor core 31 and a plurality of permanent magnets 32.

The rotor core 31 is formed in an annular shape (an annular ring shape) disposed coaxially with the stator 20. The rotation shaft 60 is disposed inside the rotor core 31. The rotation shaft 60 is fixed to the rotor core 31.

The plurality of permanent magnets 32 are fixed to the rotor core 31. In the present embodiment, a set of two permanent magnets 32 form one magnetic pole. A plurality of sets of permanent magnets 32 are arranged at equal intervals in the circumferential direction. In the present embodiment, 12 sets (24 in total) of permanent magnets 32 are provided at every 30 degrees of the central angle centered on the central axis O.

In the present embodiment, an interior permanent magnet motor is adopted as a permanent magnetic electric motor. A plurality of through-holes 33 that penetrate the rotor core 31 in the axial direction are formed in the rotor core 31. The plurality of through-holes 33 are provided to correspond to the plurality of permanent magnets 32. Each permanent magnet 32 is fixed to the rotor core 31 in a state in which it is disposed in the corresponding through-hole 33. Fixing of each permanent magnet 32 to the rotor core 31 can be realized, for example, by providing adhesion between an outer surface of the permanent magnet 32 and an inner surface of the through-hole 33 with an adhesive or the like. Also, as the permanent magnetic electric motor, a surface permanent magnet motor may be adopted instead of the interior permanent magnet motor.

<Laminated Core>

Figure 3:
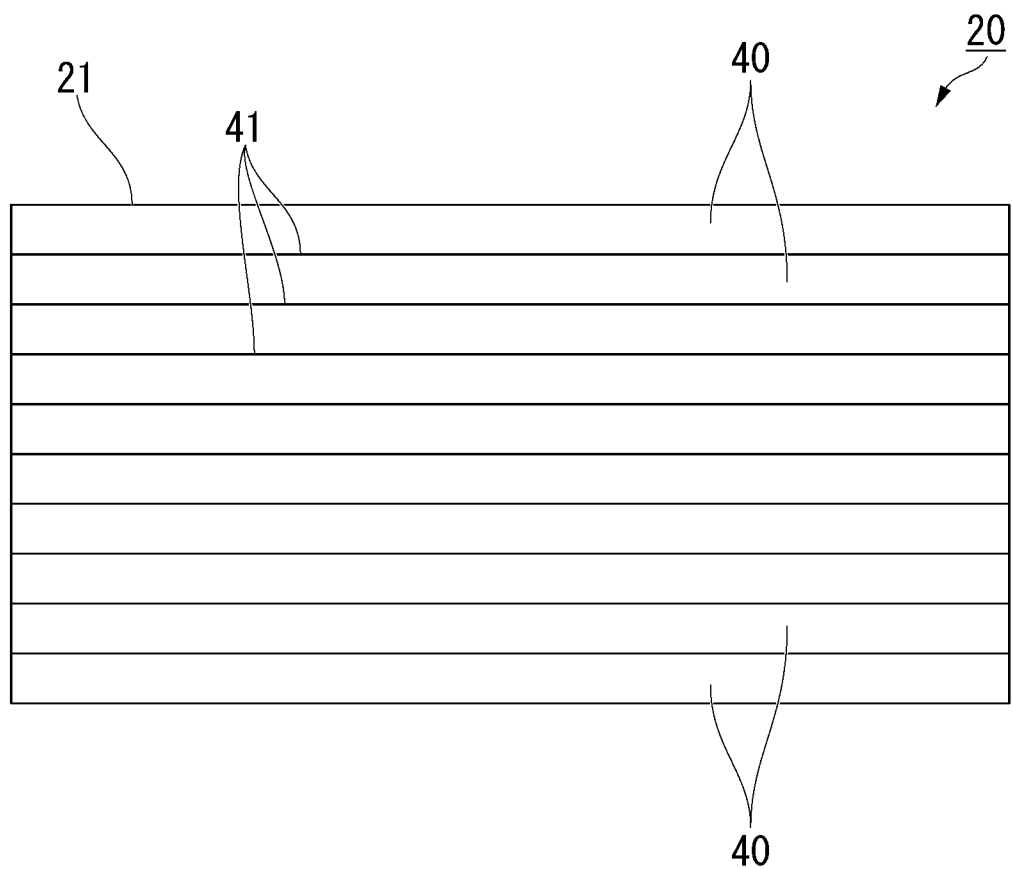
FIG. 3 is a front view of the stator included in the electric motor shown in FIG. 1.

As shown in FIG. 3, the stator core 21 is a laminated core. The stator core 21 is formed by laminating a plurality of electrical steel sheets 40. That is, the stator core 21 includes a plurality of electrical steel sheets 40 laminated in the axial direction.

Further, a stacking thickness of the stator core 21 is, for example, 50.0 mm. An outer diameter of the stator core 21 is, for example, 250.0 mm. An inner diameter of the stator core 21 is, for example, 165.0 mm. However, these values are examples, and the stacking thickness, the outer diameter, and the inner diameter of the stator core 21 are not limited to these values. Here, the inner diameter of the stator core 21 is measured with tips of the tooth parts 23 of the stator core 21 as a reference. The inner diameter of the stator core 21 is a diameter of a virtual circle inscribed in the tips of all the tooth parts 23.

Each electrical steel sheet 40 forming the stator core 21 and the rotor core 31 is formed, for example, by punching an electrical steel sheet serving as a base material. As the electrical steel sheet 40, a known electrical steel sheet can be used. A chemical composition of the electrical steel sheet 40 is not particularly limited. In the present embodiment, a non-grain-oriented electrical steel sheet is used as the electrical steel sheet 40. As the non-grain-oriented electrical steel sheet, for example, a non-grain-oriented electrical steel strip of JIS C 2552:2014 can be adopted.

However, as the electrical steel sheet 40, it is also possible to use a grain-oriented electrical steel sheet instead of the non-grain-oriented electrical steel sheet. As the grain-oriented electrical steel sheet, for example, a grain-oriented electrical steel strip of JIS C 2553:2012 can be adopted.

Insulation coatings are provided on both surfaces of the electrical steel sheet 40 in order to improve workability of the electrical steel sheet and an iron loss of the laminated core. As a substance constituting the insulation coating, for example, (1) an inorganic compound, (2) an organic resin, (3) a mixture of an inorganic compound and an organic resin, and the like can be adopted. As the inorganic compound, for example, (1) a complex of dichromate and boric acid, (2) a complex of phosphate and silica, and the like can be exemplified. As the organic resin, an epoxy-based resin, an acrylic-based resin, an acryl-styrene-based resin, a polyester-based resin, a silicone-based resin, and a fluorine-based resin can be exemplified.

In order to ensure insulation performance between the electrical steel sheets 40 stacked on each other, a thickness of the insulation coating (a thickness per one surface of the electrical steel sheet 40) is preferably 0.1 µm or more.

On the other hand, the insulation effect saturates as the insulation coating becomes thicker. Further, as the insulation coating becomes thicker, a space factor of the insulation coating in the stator core 21 increases, and magnetic properties of the stator core 21 deteriorate. Therefore, the insulation coating may be as thin as possible while still ensuring the insulation performance. The thickness of the insulation coating (thickness per one surface of the electrical steel sheet 40) is preferably 0.1 µm or more and 5 µm or less, and more preferably 0.1 µm or more and 2 µm or less.

As the electrical steel sheet 40 becomes thinner, the effect of improving the iron loss gradually saturates. Further, as the electrical steel sheet 40 becomes thinner, manufacturing costs of the electrical steel sheet 40 increase. For that reason, the thickness of the electrical steel sheet 40 is preferably 0.10 mm or more in consideration of the effect of improving the iron loss and the manufacturing costs.

On the other hand, if the electrical steel sheet 40 is too thick, press punching work of the electrical steel sheet 40 becomes difficult. For that reason, considering the press punching work of the electrical steel sheet 40, the thickness of the electrical steel sheet 40 is preferably 0.65 mm or less.

Further, as the electrical steel sheet 40 becomes thicker, the iron loss increases. For that reason, considering iron loss characteristics of the electrical steel sheet 40, the thickness of the electrical steel sheet 40 is preferably 0.35 mm or less, more preferably 0.20 mm or 0.25 mm.

In consideration of the above points, the thickness of each electrical steel sheet 40 is, for example, 0.10 mm or more and 0.65 mm or less, preferably 0.10 mm or more and 0.35 mm or less, and more preferably 0.20 mm or 0.25 mm. Also, the thickness of the electrical steel sheet 40 also includes the thickness of the insulation coating.

The plurality of electrical steel sheets 40 forming the stator core 21 adhere to each other by an adhesion part 41. The adhesion part 41 is an adhesive that is provided between the electrical steel sheets 40 adjacent to each other in the axial direction and is cured without being divided. As the adhesive, for example, a thermosetting adhesive by polymer bonding is used. As a composition of the adhesive, (1) an acrylic-based resin, (2) an epoxy-based resin, (3) a composition containing an acrylic-based resin and an epoxy-based resin, and the like can be adapted. As such an adhesive, a radical polymerization type adhesive or the like can be used in addition to a thermosetting type adhesive, and from the viewpoint of productivity, a room temperature curing type adhesive is preferably used. The room temperature curing type adhesive cures at 20° C. to 30° C. As the room temperature curing type adhesive, an acrylic-based adhesive is preferable. A typical acrylic-based adhesive includes a second generation acrylic adhesive (SGA) and the like. Any of an anaerobic adhesive, an instant adhesive, and an elastomer-containing acrylic-based adhesive can be used within the range in which the effects of the present invention are not impaired. Also, the adhesive mentioned herein is an adhesive in a state before curing and becomes the adhesion part 41 after the adhesive is cured.

An average tensile modulus of elasticity E of the adhesion part 41 at room temperature (20° C. to 30° C.) is in the range of 1500 MPa to 4500 MPa. If the average tensile modulus of elasticity E of the adhesion part 41 is less than 1500 MPa, there will be a problem that rigidity of the laminated core is lowered. For that reason, a lower limit of the average tensile modulus of elasticity E of the adhesion part 41 is 1500 MPa, more preferably 1800 MPa. On the contrary, if the average tensile modulus of elasticity E of the adhesion part 41 exceeds 4500 MPa, there is a problem of the insulation coating formed on the surface of the electrical steel sheet 40 being peeled off. For that reason, an upper limit of the average tensile modulus of elasticity E of the adhesion part 41 is 4500 MPa, more preferably 3650 MPa.

Also, the average tensile modulus of elasticity E is measured using a resonance method. Specifically, the tensile modulus of elasticity is measured in accordance with JIS R 1602:1995.

More specifically, first, a sample for measurement (not shown) is manufactured. This sample is obtained by adhering between two electrical steel sheets 40 using an adhesive, which is a measurement target, and curing them to form the adhesion part 41. In a case in which the adhesive is a thermosetting type, the curing is performed by heating and pressurizing it under heating and pressurizing conditions in actual work. On the other hand, in a case in which the adhesive is a room temperature curing type, the curing is performed by pressurizing it at room temperature.

In addition, the tensile modulus of elasticity of this sample is measured using the resonance method. As described above, the method for measuring the tensile modulus of elasticity using the resonance method is performed in accordance with JIS R 1602:1995. Then, the tensile modulus of elasticity of the adhesion part 41 alone can be obtained by removing influence of the electrical steel sheet 40 itself from the tensile modulus of elasticity (measured value) of the sample by calculation.

Since the tensile modulus of elasticity obtained from the sample in this way is equal to an average value of the entire laminated core, this value is regarded as the average tensile modulus of elasticity E. The composition is set such that the average tensile modulus of elasticity E hardly changes at a laminated position in the axial direction or at a circumferential position around the central axis of the laminated core. For that reason, the average tensile modulus of elasticity E can be set to a value obtained by measuring the adhesion part 41 after curing at the upper end position of the laminated core.

The motor generates heat when driven. For this reason, if a melting point of the adhesion part 41 is low, the adhesion part 41 melts due to the heat generated by the motor, and a shape of the adhesion region 42 changes, so that a desired effect cannot be obtained. Generally, an insulation coating (enamel) is provided on a surface of the winding wound around the stator core 21. A heatproof temperature of this coating is, for example, about 180° C. For this reason, a general motor is driven to be 180° C. or lower. That is, the motor can heat up to about 180° C. In the present embodiment, the melting point of the adhesion part 41 is preferably 180° C. or higher. Further, the melting point of the adhesion part 41 is more preferably 200° C. or higher in consideration of a safety factor taking the fact that there is a part at which the temperature is locally high into account.

As an adhesion method, for example, a method with which an adhesive is applied to the electrical steel sheets 40 and then they are adhered by heating, pressure bonding, or both can be adopted. Also, a heating means may be any means such as heating in a high temperature bath or an electric furnace, or a method of directly energizing.

In order to obtain stable and sufficient adhesion strength, a thickness of the adhesion part 41 is preferably 1 μm or more.

On the other hand, if the thickness of the adhesion part 41 exceeds 100 μm, an adhesion force is saturated. Further, as the adhesion part 41 becomes thicker, a space factor thereof decreases, and the magnetic properties such as the iron loss of the laminated core decrease. Therefore, the thickness of the adhesion part 41 is preferably 1 μm or more and 100 μm or less, more preferably 1 μm or more and 10 μm or less.

Further, in the above, the thickness of the adhesion part 41 indicates the average thickness of the adhesion part 41.

The average thickness of the adhesion part 41 is more preferably 1.0 μm or more and 3.0 μm or less. If the average thickness of the adhesion part 41 is less than 1.0 μm, sufficient adhesion strength cannot be secured as described above. For that reason, a lower limit of the average thickness of the adhesion part 41 is 1.0 μm, more preferably 1.2 μm. On the contrary, if the average thickness of the adhesion part 41 becomes thicker than 3.0 μm, problems such as a great increase in a strain amount of the electrical steel sheet 40 due to shrinkage during thermal curing occur. For that reason, an upper limit of the average thickness of the adhesion part 41 is 3.0 μm, more preferably 2.6 μm.

The average thickness of the adhesion part 41 is an average value of the entire laminated core.

The average thickness of the adhesion part 41 hardly changes at the laminated position in the axial direction and the circumferential position around the central axis of the laminated core. For that reason, the average thickness of the adhesion part 41 can be set as an average value of numerical values measured at 10 or more points in the circumferential direction at an upper end position of the laminated core.

Also, the average thickness of the adhesion part 41 can be adjusted by changing, for example, an amount of the adhesive applied. Further, for example, in the case of a thermosetting adhesive, the average tensile modulus of elasticity E of the adhesion part 41 can be adjusted by changing one or both of the heating and pressurizing conditions applied at the time of adhesion and a type of a curing agent.

Next, relationships between the electrical steel sheets 40, the adhesion parts 41, and the adhesion regions 42 will be described with reference to FIG. 4.

Figure 4:
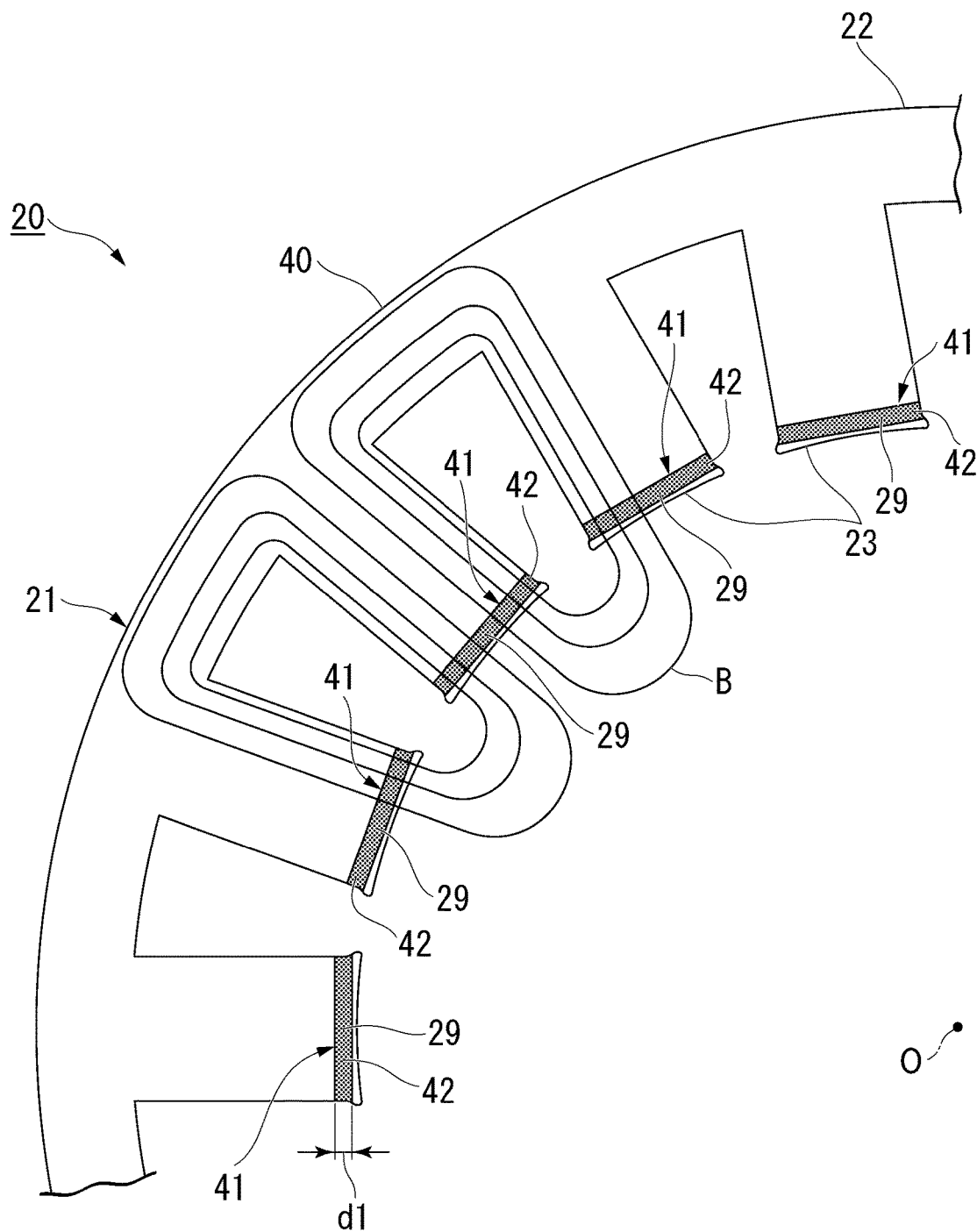
FIG. 4 is a schematic view of an electrical steel sheet and an adhesion region of the stator shown in FIGS. 2 and 3.

As shown in FIG. 4, the electrical steel sheets 40 adjacent to each other in the axial direction are not subjected to whole surface adhesion. These electrical steel sheets 40 locally adhere to each other. The adhesion parts 41 are provided in the plurality of tooth parts 23 of the electrical steel sheets. The tooth parts 23 adhere to each other due to the adhesion parts 41. That is, the plurality of electrical steel sheets 40 adhere to each other due to the adhesion parts 41.

The adhesion regions 42 and non-adhesion regions (blank regions) are formed on surfaces of the electrical steel sheets 40 facing the axial direction (hereinafter referred to as first surfaces of the electrical steel sheet 40). The adhesion regions 42 are regions on the first surfaces of the electrical steel sheets 40 on which the adhesion parts 41 are provided. More specifically, the adhesion regions 42 are regions of the first surfaces of the electrical steel sheets 40 on which the cured adhesives are provided. The non-adhesion regions are regions on the first surfaces of the electrical steel sheets on which the adhesion parts 41 are not provided.

One adhesion part 41 is provided in one tooth part 23. According to the present embodiment, the adhesion parts 41 are respectively provided on the plurality of tooth parts 23. For this reason, the plurality of adhesion parts 41 are discretely provided in the circumferential direction as the entire electrical steel sheets 40. As a result, the electrical steel sheets 40 can be fixed to each other in a well-balanced manner.

The adhesion part 41 is formed in a belt shape or a band extending linearly in the circumferential direction. Therefore, the adhesion region 42 is also formed in a belt shape or band extending linearly in the circumferential direction, similarly to the adhesion part 41. That is, the adhesion region 42 extends in a direction orthogonal to a direction in which the tooth part 23 extends. A width dimension of the adhesion region 42 is uniform over the entire length of the adhesion region 42. Further, the adhesion region 42 is located in the vicinity of the tip of the tooth part 23. Here, the vicinity of the tip of the tooth part 23 is a range from the tip of the tooth part 23 to 1/10 of a radial length of the tooth part 23 along the radial length of the tooth part 23.

Also, in the present specification, the direction in which the tooth part 23 extends (that is, the radial direction) may be referred to as a length direction of the tooth part 23, and a direction orthogonal to the length direction may be referred to as a width direction of the tooth part 23.

Further, in the present specification, the "belt shape" or band as a shape in which the adhesion part 41 extends indicates that a shape extends in one direction and a width thereof is equal to or more than 1.5% of the outer diameter of the stator core 21. By forming the width of the adhesion part 41 to be equal to or more than 1.5% of the outer diameter of the stator core 21, adhesion strength between the electrical steel sheets 40 can be sufficient! y secured.

Also, in the present embodiment, the case in which the width dimension of the adhesion region 42 is uniform over the entire length of the adhesion region 42 has been described. However, the width dimension of the adhesion region 42 does not necessarily have to be uniform. As an example, both end parts of the adhesion region 42 in the width direction may wind and extend in the length direction.

The adhesion part 41 has a substantially rectangular shape of which a longitudinal direction is orthogonal to the radial direction in a plan view. According to the present embodiment, by forming the adhesion part 41 to have a shape extending in one direction, an adhesive area of the adhesion part 41 can be increased to enhance the adhesion strength as compared with a case in which the adhesion parts 41 having a point shape are intermittently provided in the same range.

By increasing a width dimension d1 of the adhesion part 41, the adhesion part 41 can be easily formed in a manufacturing process. Further, by reducing the width dimension d1 of the adhesion part 41, deterioration of the iron loss of the entire electrical steel sheet 40 can be inhibited without causing a large local strain in the electrical steel sheet 40 due to a compressive stress of the adhesive.

Also, the width dimension d1 of the adhesion part 41 is a dimension of the adhesion part 41 formed in a belt shape or band in a lateral direction thereof and is a dimension of the adhesion part 41 in the radial direction in the present embodiment. In the present embodiment, since the adhesion region 42 is a region in which the adhesion part 41 is provided on the first surface of the electrical steel sheet 40, the width dimension of the adhesion region 42 and the width dimension of the adhesion part 41 are the same. As shown in the drawings, the width dimension d1 of the adhesion region is less than the length of the tooth part.

The adhesion part 41 extends over the entire width of the tooth part 23. According to the present embodiment, since the adhesion part 41 is formed in a belt shape extending over the entire width of the tooth part 23, the adhesion strength between the tooth parts 23 is easily secured.

In the present embodiment, the adhesive shrinks when cured. For this reason, a strain due to the cure shrinkage of the adhesive occurs in the region of the electrical steel sheet 40 in contact with the adhesion region 42, and the iron loss of the electrical steel sheet 40 increases in the region. Here, in the first surface of the electrical steel sheet 40, a region in which the iron loss increases due to the strain resulting from the contact with the adhesion part 41 is referred to as a deterioration region 29. The deterioration region 29 is a region that overlaps the adhesion region 42 when viewed from the axial direction. The deterioration region 29 has higher magnetic resistance than other regions (non-deterioration regions).

In the present specification, an increase in a value of the iron loss may be referred to as "deterioration in iron loss".

Magnetic flux B is formed on the electrical steel sheet 40 by a current flowing through the winding (not shown) of the stator 20. The magnetic flux B forms a magnetic circuit that passes through the tooth part 23 and the core back part 22. The magnetic flux B extends in the radial direction in the tooth part 23.

According to the present embodiment, the adhesion region 42 is formed in the tooth part 23 in a belt shape extending in the circumferential direction. Therefore, the deterioration region 29 is formed in the tooth part 23 in a belt shape extending in the circumferential direction. As described above, the magnetic flux B flows in the tooth part 23 in the radial direction. For this reason, by forming the adhesion region 42 having a belt shape extending in the circumferential direction in the tooth part 23, a length of a path of the magnetic flux B passing through the deterioration region 29 is shortened. As a result, the magnetic resistance to the magnetic flux B in the magnetic circuit decreases, so that the magnetic properties of the stator core 21 can be improved as compared to the case in which electrical steel sheets are fixed to each other by fastening.

In the present embodiment, the rotor core 31 is a laminated core like the stator core 21. That is, the rotor core 31 includes a plurality of electrical steel sheets laminated in a thickness direction thereof. In the present embodiment, a stacking thickness of the rotor core 31 is equal to that of the stator core 21, for example, 50.0 mm. An outer diameter of the rotor core 31 is, for example, 163.0 mm. An inner diameter of the rotor core 31 is, for example, 30.0 mm. However, these values are examples, and the stacking thickness, the outer diameter, and the inner diameter of the rotor core 31 are not limited to these values.

In the present embodiment, the plurality of electrical steel sheets forming the rotor core 31 are fixed to each other by fastening C (dowels, see FIG. 1). However, the plurality of electrical steel sheets 40 forming the rotor core 31 may adhere to each other by adhesion parts.

Also, laminated cores such as the stator core 21 and the rotor core 31 may be formed by so-called turn-stacking.

Modified Example 1

Next, an adhesion part 141 and an adhesion region 142 of a modified example 1 that can be adopted in the above-described embodiment will be described with reference to FIGS. 5A, 5B, and 5C. Also, components of the same aspects as those in the above-described embodiment will be denoted by the same reference numerals, and descriptions thereof will be omitted.

Similarly to the above-described embodiment, the tooth part 23 has the adhesion region 142 provided with the adhesion part 141 having a belt shape or band extending in the circumferential direction. The adhesion part 141 of the present modified example is mainly different from that of the above-described embodiment in that the adhesion region 142 is disposed in the vicinity of a base end of the tooth part 23.

Similarly to the above-described embodiment, the adhesion region 142 is formed in a belt shape extending linearly along the circumferential direction. A width dimension of the adhesion region 142 is uniform over the entire length of the adhesion region 142. A region (a deterioration region 129) in which the iron loss increases due to a strain resulting from a contact with the adhesion region 142 is formed in the electrical steel sheet 40. According to the present modified example, since a length of a path of the magnetic flux B passing through the deterioration region 129 is shortened, the magnetic resistance to the magnetic flux B in the magnetic circuit is reduced, so that the magnetic properties of the stator core 21 can be improved.

The magnetic flux B diffuses and extends from the tip of the tooth part 23 to both circumferential sides. For this reason, in the vicinity of the tip of the tooth part 23, the magnetic flux B is concentrated at both circumferential end parts, and the magnetic flux density tends to increase. If the deterioration region is provided in a region having a high magnetic flux density, the increase in iron loss tends to be remarkable. For this reason, if the deterioration region 129 is provided in the vicinity of the tip of the tooth part 23, as shown in FIG. 5A, the iron loss tends to increase. The adhesion region 142 of the present modified example is formed in the vicinity of the base end of the tooth part 23. That is, the adhesion region 142 is formed on a side closer to the core back part 22 than the vicinity of the tip of the tooth part 23. For this reason, the deterioration region 129 can be disposed away from the region having a high magnetic flux density, so that an increase in iron loss can be inhibited. As a result, the magnetic resistance to the magnetic flux B in the magnetic circuit decreases, so that the magnetic properties of the stator core 21 can be improved. If the adhesion region 142 is disposed on the base end side from ½ of the entire length of the tooth part 23, as shown in FIG. 5C, the above effect can be obtained, and if the adhesion region 142 is disposed on the base end side from ⅓ of the entire length of the tooth part 23, as shown in FIG. 5B, the above-mentioned effect can be obtained more remarkably.

Modified Example 2

Next, an adhesion part 241 and an adhesion region 242 of a modified example 2 that can be adopted in the above-described embodiment will be described with reference to FIG. 6. Also, components of the same aspects as those in the above-described embodiment will be denoted by the same reference numerals, and descriptions thereof will be omitted.

Similarly to the above-described embodiment, the tooth part 23 has the adhesion region 242 provided with the adhesion part 241 having a belt shape or band extending in the circumferential direction. The adhesion part 241 of the present modified example is mainly different from that of the above-described embodiment in that the adhesion region 242 is formed at a substantial center of the tooth part 23 in the length direction.

Similarly to the above-described embodiment, since the adhesion region 242 is formed in a belt shape extending linearly in the circumferential direction, a length of a path of the magnetic flux B passing through a deterioration region 229 can be shortened. As a result, the magnetic resistance to the magnetic flux B in the magnetic circuit decreases, so that the magnetic properties of the stator core 21 can be improved. Also, the adhesion region 242 of the present modified example is uniform over the entire length of the adhesion region 242.

Further, since the adhesion region 242 of the present modified example is located on a side closer to the core back part 22 than the vicinity of the tip of the tooth part 23, similarly to the adhesion region 242 of the modified example 1, an increase in iron loss can be inhibited. As a result, the magnetic resistance to the magnetic flux B in the magnetic circuit decreases, so that the magnetic properties of the stator core 21 can be improved.

Modified Example 3

Figure 7:
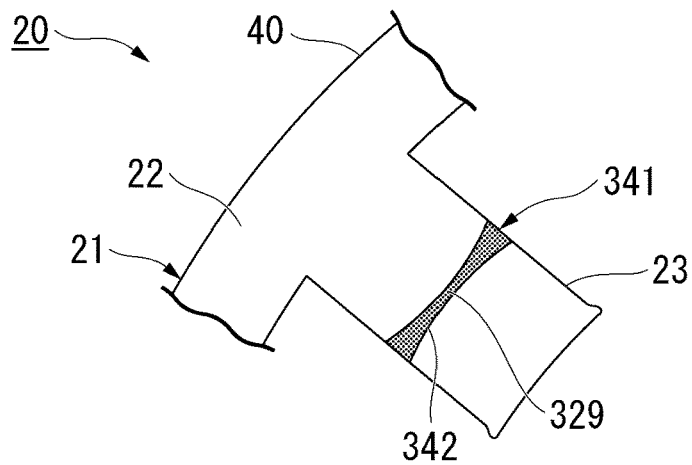
FIG. 7 is a schematic view of an adhesion region of a stator of a modified example 3.

Next, an adhesion part 341 and an adhesion region 342 of a modified example 3 that can be adopted in the above-described embodiment will be described with reference to FIG. 7. Also, components of the same aspects as those in the above-described embodiment will be denoted by the same reference numerals, and descriptions thereof will be omitted.

Similarly to the above-described embodiment, the tooth part 23 has the adhesion region 342 provided with the adhesion part 341 having a belt shape or band extending in the circumferential direction. The adhesion region 342 of the present modified example is similar to the configuration of the adhesion region 242 of the modified example 2. According to the stator core 21 having the adhesion part 341 of the present modified example, the same effects as those of the stator core 21 having the adhesion part 241 of the modified example 2 can be obtained. The adhesion region 342 of the present modified example is different from the adhesion region 242 of the modified example 2 in that the width dimension is not uniform over the entire length of the adhesion region 342.

Both end parts of the adhesion region 342 in the width direction of the present modified example have a curved shape. Both end parts of the adhesion region 342 in the width direction are separated from each other from a circumferential central part of the tooth part 23 toward circumferential end part sides of the tooth part 23. For this reason, the width dimension of the adhesion region 342 in the radial direction increases from the circumferential central part in the direction of the tooth part 23 toward the circumferential end part sides of the tooth part 23. The adhesion region 342 has the smallest width dimension in the circumferential central part 329 of the tooth part 23.

As shown in FIG. 4, the magnetic flux B diffuses and extends from the tip of the tooth part 23 to both circumferential sides. Further, the magnetic flux B tends to flow to pass the shortest distance. For this reason, the magnetic flux density of the tooth part 23 tends to increase toward the circumferential end part sides. If a variation in the magnetic flux density of the tooth part 23 increases in the circumferential direction, the magnetic properties of the stator core 21 may deteriorate.

According to the present modified example, the width dimension of the adhesion region 342 in the radial direction increases from the central part of the tooth part 23 toward the circumferential end part sides. That is, a length of a deterioration region 391 in the radial direction increases from the central part of the tooth part 23 toward end part sides thereof in the width direction. For this reason, the magnetic resistance of the tooth part 23 increases toward the circumferential end part sides, and the magnetic flux B is unlikely to flow on the circumferential end part sides. Thus, a variation in the magnetic flux density in the circumferential direction of the tooth part 23 can be inhibited, and the magnetic flux density in the tooth part 23 can be made uniform. As a result, the magnetic properties of the laminated core can be improved.

Modified Example 4

Figure 8:
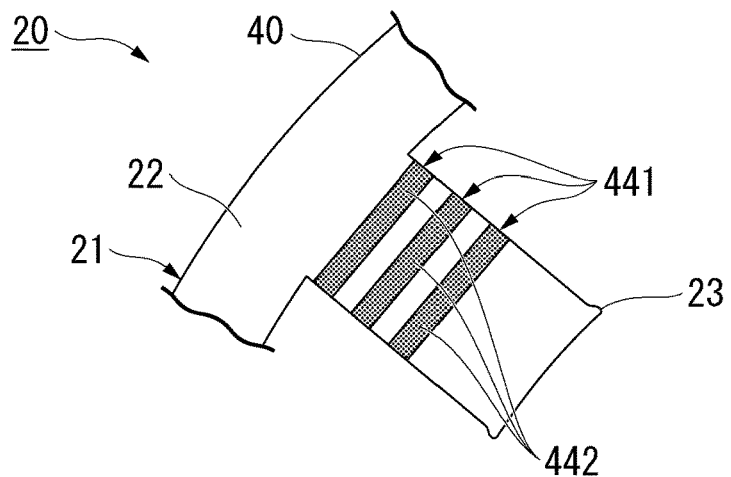
FIG. 8 is a schematic view of an adhesion region of a stator of a modified example 4.

Next, an adhesion part 441 and an adhesion region 442 of a modified example 4 that can be adopted in the above-described embodiment will be described with reference to FIG. 8. Also, components of the same aspects as those in the above-described embodiment will be denoted by the same reference numerals, and descriptions thereof will be omitted.

Similarly to the above-described embodiment, the adhesion region 442 provided with the adhesion part 441 having a belt shape or band extending linearly in the circumferential direction is provided in the tooth part 23. Further, the adhesion part 441 of the present modified example is mainly different from the above-described embodiment in that a plurality of (three) adhesion regions 442 arranged in the extending direction are formed in the tooth part 23. The plurality of adhesion regions 442 are arranged side by side from a center in the length direction of the tooth part 23 toward the base end side.

As shown in the present modified example, the plurality of adhesion regions 441 may be provided for each tooth part 23 in the above-described embodiment and each modified example. Even in this case, the effects of the embodiments and modified examples can be obtained, and in addition, the adhesion strength between the electrical steel sheets 40 can be increased.

In a case in which the plurality of adhesion regions 442 are provided in one tooth part 23, the width dimension of the adhesion region 442 is preferably smaller than an interval dimension between the adjacent adhesion regions 442. As a result, it is possible to inhibit the strain of the electrical steel sheet due to the plurality of adhesion regions 442, thereby inhibiting the deterioration (increase) in the iron loss of the electrical steel sheet.

Modified Example 5

Figure 9:
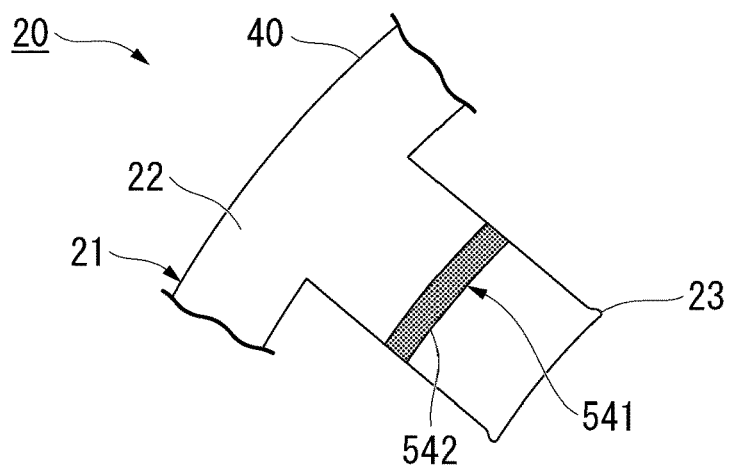
FIG. 9 is a schematic view of an adhesion region of a stator of a modified example 5.

Next, an adhesion part 541 and an adhesion region 542 of a modified example 5 that can be adopted in the above-described embodiment will be described with reference to FIG. 9. Also, components of the same aspects as those in the above-described embodiment will be denoted by the same reference numerals, and descriptions thereof will be omitted.

Similarly to the above-described embodiment, the adhesion region 542 provided with the adhesion part 541 having a belt shape or band extending in the circumferential direction is provided in the tooth part 23. The adhesion part 541 of the present modified example is mainly different from the above-described embodiment in that the adhesion region 542 extends in an arc shape in the circumferential direction. Since the adhesion part 541 of the present modified example can be uniformly applied in the circumferential direction, the manufacturing process can be simplified.

Also, the technical scope of the present invention is not limited to the above-described embodiment and its modified examples, and various changes can be added thereto without departing from the spirit of the present invention.

In the stator core of the above-described embodiment and its modified examples, the plurality of electrical steel sheets are fixed to each other at the adhesion part provided in the tooth part. However, the electrical steel sheets may be fixed to each other not only in the tooth part but also in the core back part. In this case, the core back part may be provided with a fastening part, or the core back part may be provided with a separate adhesion part. Further, the electrical steel sheets may be welded and fixed to each other in addition to the adhesive fixing due to the adhesion part. That is, the effects of the present embodiment can be obtained regardless of the method of fixing the core back part.

The shape of the stator core is not limited to the form shown in the above embodiment. Specifically, dimensions of the outer diameter and the inner diameter of the stator core, the stacking thickness, the number of slots, a dimensional ratio of the tooth part between in the circumferential direction and in the radial direction, a dimensional ratio in the radial direction between the tooth part and the core back part, and the like can be arbitrarily designed in accordance with desired characteristics of the electric motor.

In the rotor of the above embodiment, the set of two permanent magnets 32 form one magnetic pole, but the present invention is not limited thereto. For example, one permanent magnet 32 may form one magnetic pole, or three or more permanent magnets 32 may form one magnetic pole.

In the above-described embodiment, the permanent magnetic electric motor has been described as an example of the electric motor, but as illustrated below, the structure of the electric motor is not limited thereto, and various known structures not illustrated below can also be adopted.

In the above-described embodiment, the permanent magnetic electric motor has been described as an example of the synchronous motor, but the present invention is not limited thereto. For example, the electric motor may be a reluctance motor or an electromagnet field motor (a wound-field motor).

In the above-described embodiment, the synchronous motor has been described as an example of the AC motor, but the present invention is not limited thereto. For example, the electric motor may be an induction motor.

In the above-described embodiment, the AC motor has been described as an example of the motor, but the present invention is not limited thereto. For example, the electric motor may be a DC motor.

In the above-described embodiment, the motor has been described as an example of the electric motor, but the present invention is not limited thereto. For example, the electric motor may be a generator.

In the above embodiment, the case in which the laminated core according to the present invention is applied to the stator core has been shown, but it can also be applied to the rotor core.

In addition, it is possible to replace the components in the embodiment and its modified examples with well-known components as appropriate, and the above-mentioned modified examples may be combined with each other as appropriate without departing from the spirit of the present invention.

EXAMPLE

A verification test was conducted to verify inhibition of the deterioration in iron loss of the electrical steel sheets due to the compressive stress of the adhesion part. This verification test was carried out by simulation using software. As the software, JMAG, an electromagnetic field simulation software based on finite element method manufactured by JSOL Corporation, was used. As a model used for the simulation, stator cores (laminated cores) of model No. 1 to model No. 4 described below were assumed. As the electrical steel sheets used for each model, those produced by punching thin sheets having a sheet thickness of 0.25 mm and a sheet thickness of 0.20 mm were used. The shape of the electrical steel sheet is the same as that shown in FIG. 2.

The structure of fixing the electrical steel sheets is different between the stator cores of models No. 1 to No. 3 and the stator core of model No. 4. In the stator cores of models No. 1 to No. 3, the adhesion part is provided between the electrical steel sheets, and the electrical steel sheets are adhesively fixed to each other. On the other hand, in the stator core of model No. 4, the electrical steel sheets are fixed to each other by fastening.

The adhesion region of model No. 1 corresponds to the adhesion region 42 shown in FIG. 4. Adhesion regions of model No. 1 are formed in a plurality of tooth parts, and each adhesion region is formed in a belt shape extending linearly in the circumferential direction in the vicinity of the tip of the tooth part.

Figure 5A:
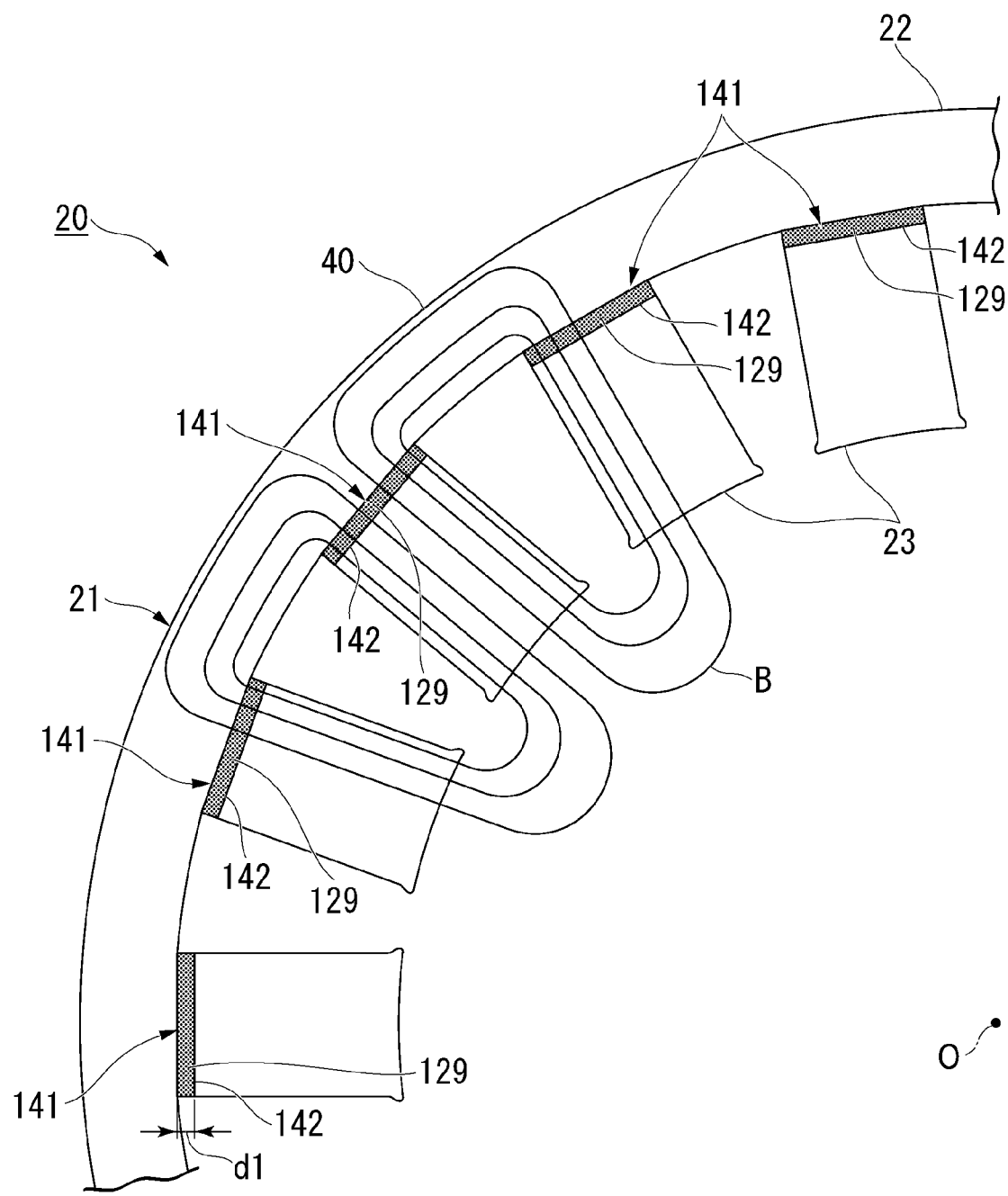
FIGS. 5A, 5B, and 5C are schematic views of adhesion regions of stators of modified example 1.
Figure 5B:
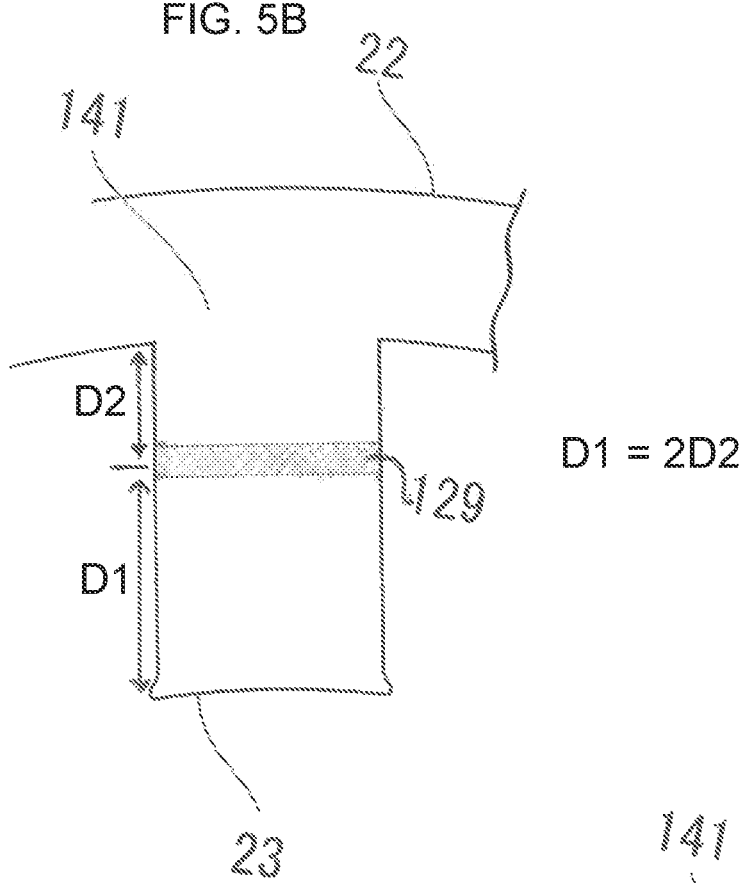
Figure 5C:
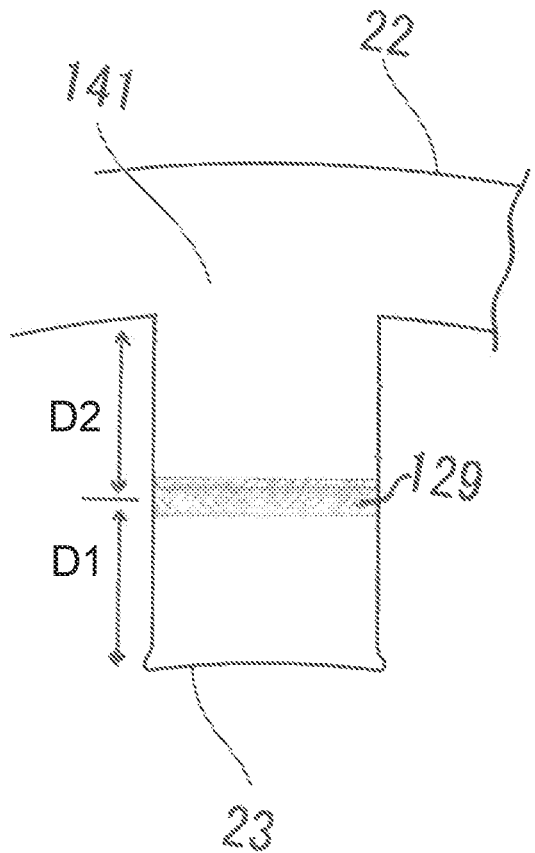

The adhesion region of model No. 2 corresponds to the adhesion region 142 shown in FIG. 5A. Adhesion regions of model No. 2 are formed in a plurality of tooth parts, and each adhesion region is formed in a belt shape extending linearly in the circumferential direction in the vicinity of the base end of the tooth part.

Figure 6:
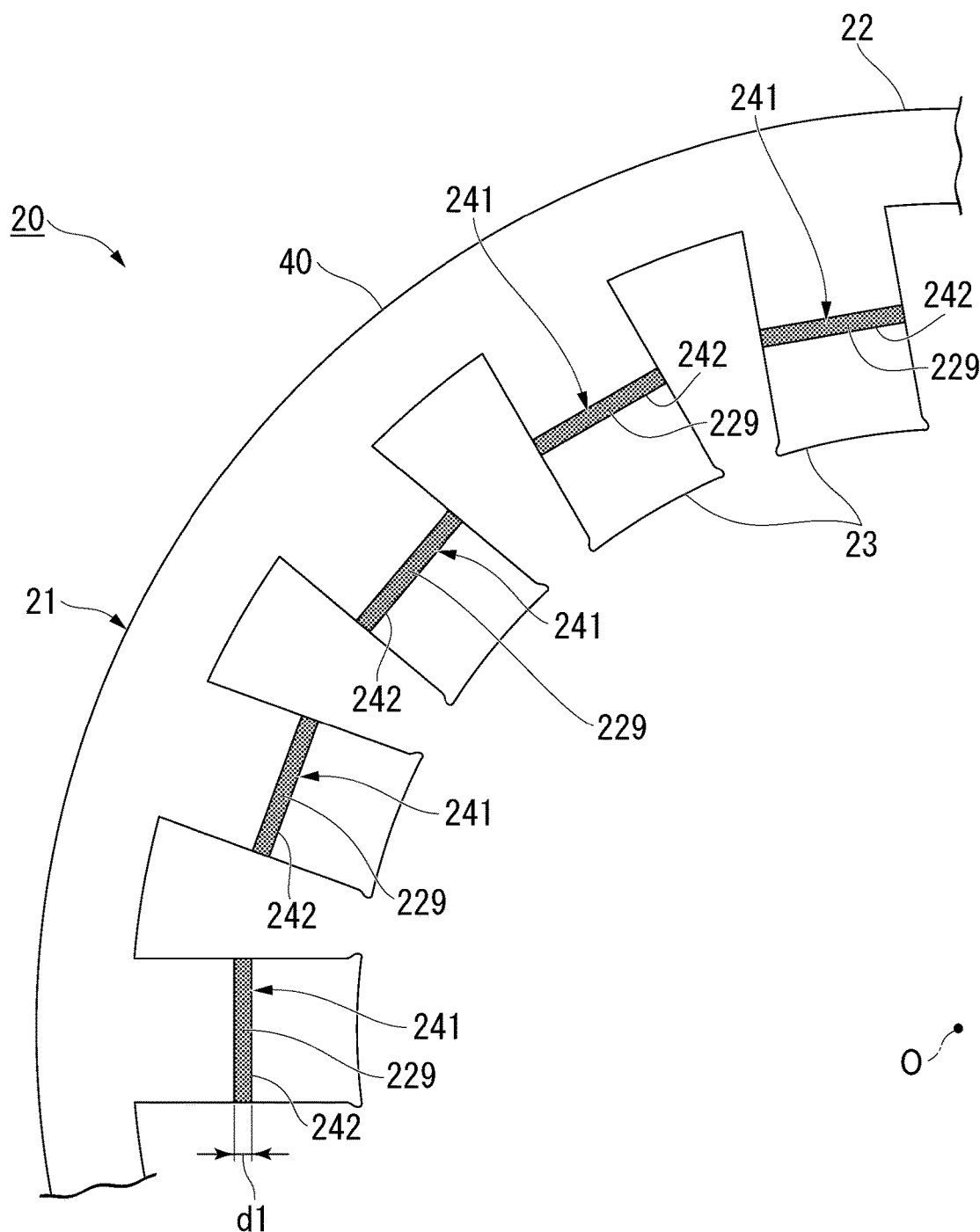
FIG. 6 is a schematic view of an adhesion region of a stator of a modified example 2.

The adhesion region of model No. 3 corresponds to the adhesion region 242 shown in FIG. 6. Adhesion regions of model No. 3 are formed in a plurality of tooth parts, and each adhesion region is formed in a belt shape extending linearly in the circumferential direction at the center of the tooth part in the length direction.

Figure 11:
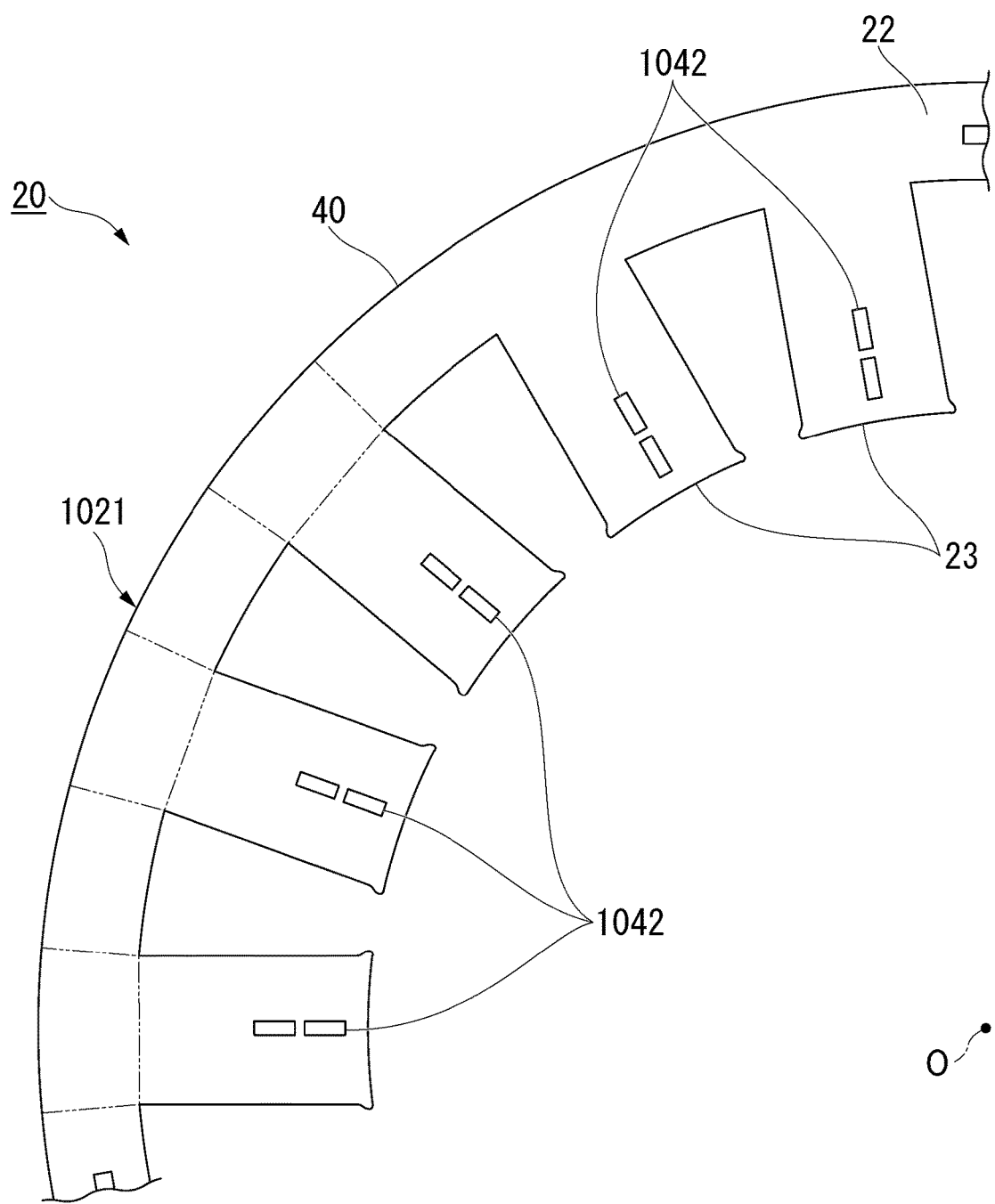
FIG. 11 is a schematic view of a stator core of model No. 4 as a comparative example.

A stator core 1021 of model No. 4 is shown in FIG. 11. The stator core 1021 is formed by laminating electrical steel sheets 40 having the same shape as the stator core 21 of the above-described embodiment in the thickness direction. The stator core 1021 is different from the stator core 21 of the above-described embodiment in that the electrical steel sheets 40 are fastened and fixed to each other. That is, the electrical steel sheets 40 of the stator core 1021 are fixed to each other by fastening 1042 (dowels). The fastening 1042 is located at the tooth part 23.

Figure 10:
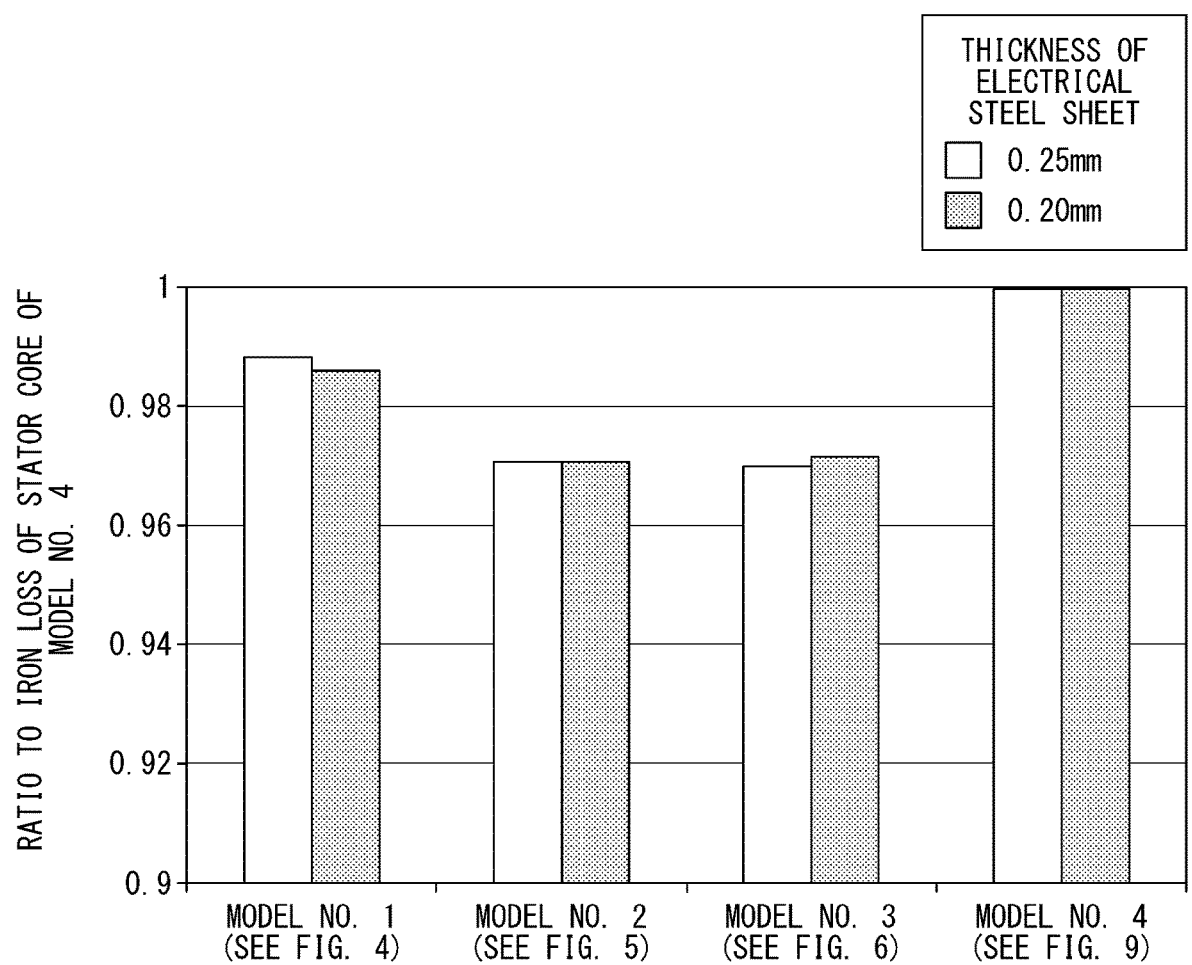
FIG. 10 is a graph showing simulation results of iron losses of model No. 1 to model No. 4.

For each model, FIG. 10 shows calculation results of the iron loss of the electrical steel sheet calculated by the simulation software. Further, in the iron loss (vertical axis) of the calculation results shown in FIG. 10, an iron loss of the model No. 4 was set to 1.0, and an iron loss of another model was expressed as a ratio thereof with respect to the iron loss of the model No. 4.

As shown in FIG. 10, it was confirmed that the stator cores of models No. 1 to No. 3 had smaller iron loss values than that of the stator core of model No. 4.

The stator core of model No. 1 has a larger iron loss than the stator cores of model No. 2 and model No. 3. In the stator core of model No. 1, as shown in FIG. 4, it is considered that since the adhesion region is disposed in the vicinity of the tip of the tooth part, the iron loss increased because the deterioration region was provided in the region having a high magnetic flux density. On the other hand, in the stator cores of model No. 2 and model No. 3, as shown in FIGS. 5 and 6, it is considered that the deterioration region can be disposed away from the region having a high magnetic flux density, and the increase in iron loss was inhibited.

INDUSTRIAL APPLICABILITY

According to the present invention, the magnetic properties can be improved. Therefore, it provides great industrial applicability.

BRIEF DESCRIPTION OF THE REFERENCE SYMBOLS

10 Electric motor
20 Stator
21 Stator core (laminated core)
22 Core back part
23 Tooth part
40 Electrical steel sheet
41,141,241,341 Adhesion part
42, 142, 242, 342 Adhesion region
d1 Width dimension
B Magnetic flux

The invention claimed is:

1. A laminated core comprising:
   a plurality of electrical steel sheets stacked on each other; and
   a plurality of adhesion parts provided between the electrical steel sheets adjacent to each other in an axial direction thereof and adhering the electrical steel sheets to each other,
   wherein each of the electrical steel sheets includes an annular core back part, and a plurality of tooth parts which extend from the core back part in a radial direction of the core back part and are disposed at intervals in a circumferential direction of the core back part, and
   each of the tooth parts of the electrical steel sheets includes an adhesion region provided with one of said adhesion parts, each said adhesion part forming a band extending in the circumferential direction, and
   wherein the adhesion parts are located only on the tooth portion for controlling a uniform distribution of magnetic flux density flowing within the laminated core.

2. The laminated core according to claim 1, wherein each of the adhesion parts extends over an entire width of each of the tooth parts in the circumferential direction.

3. The laminated core according to claim 1, wherein an average thickness of each of the adhesion parts is 1.0 μm to 3.0 μm.

4. The laminated core according to claim 1, wherein an average tensile modulus of elasticity E of each of the adhesion parts is 1500 MPa to 4500 MPa.

5. The laminated core according to claim 1, wherein each of the adhesion parts are room temperature adhesion type acrylic-based adhesives each containing SGA made of an elastomer-containing acrylic-based adhesive.

6. The laminated core according to claim 1, wherein a melting point of each of the adhesion parts is 180° C. or higher.

7. An electric motor comprising the laminated core according to claim 1.

8. The laminated core according to claim 1, wherein the adhesion region is disposed on a base end side from one-third of an entire length of the tooth part in a length direction of the tooth part.

9. The laminated core according to claim 1, wherein the adhesion regions are formed on a side closer to the core back part than the vicinities of tips of the tooth parts.

10. The laminated core according to claim 9, wherein width dimensions of each of the adhesion regions in the radial direction increases from circumferential central parts of the tooth parts in the direction toward circumferential end part sides of the tooth parts.

11. The laminated core according to claim 10, wherein each of the adhesion parts extends over an entire width of each of the tooth parts in the circumferential direction.

12. The laminated core according to claim 10, wherein each of the adhesion regions extend in arc shapes in the circumferential direction.

13. The laminated core according to claim 9, wherein each of the adhesion regions extend in an arc shape in the circumferential direction.

14. The laminated core according to claim 13, wherein each of the adhesion parts extends over an entire width of each of the tooth parts in the circumferential direction.

15. The laminated core according to claim 9, wherein each of the adhesion parts extends over an entire width of each of the tooth parts in the circumferential direction.

16. The laminated core according to claim 1, wherein width dimensions of each of the adhesion regions in the radial direction increase from circumferential central parts of the tooth parts in the direction toward circumferential end part sides of the tooth parts.

17. The laminated core according to claim 16, wherein each of the adhesion parts extends over an entire width of each of the tooth parts in the circumferential direction.

18. The laminated core according to claim 16, wherein each of the adhesion regions extend in arc shapes in the circumferential direction.

19. The laminated core according to claim 18, wherein each of the adhesion parts extends over an entire width of each of the tooth parts in the circumferential direction.

20. The laminated core according to claim 1, wherein the adhesion regions extend in arc shapes in the circumferential direction.

21. The laminated core according to claim 20, wherein each of the adhesion parts extends over an entire width of each of the tooth parts in the circumferential direction.

22. The laminated core according to claim 1, wherein each of the adhesion parts extends over an entire width of each of the tooth parts in the circumferential direction, and wherein a width dimension of each adhesion parts is uniform over the entire length of the adhesion part.

* * * * *